INVENTOR
ALFRED A. NOVISSIMO
BY Albert H. Graddis

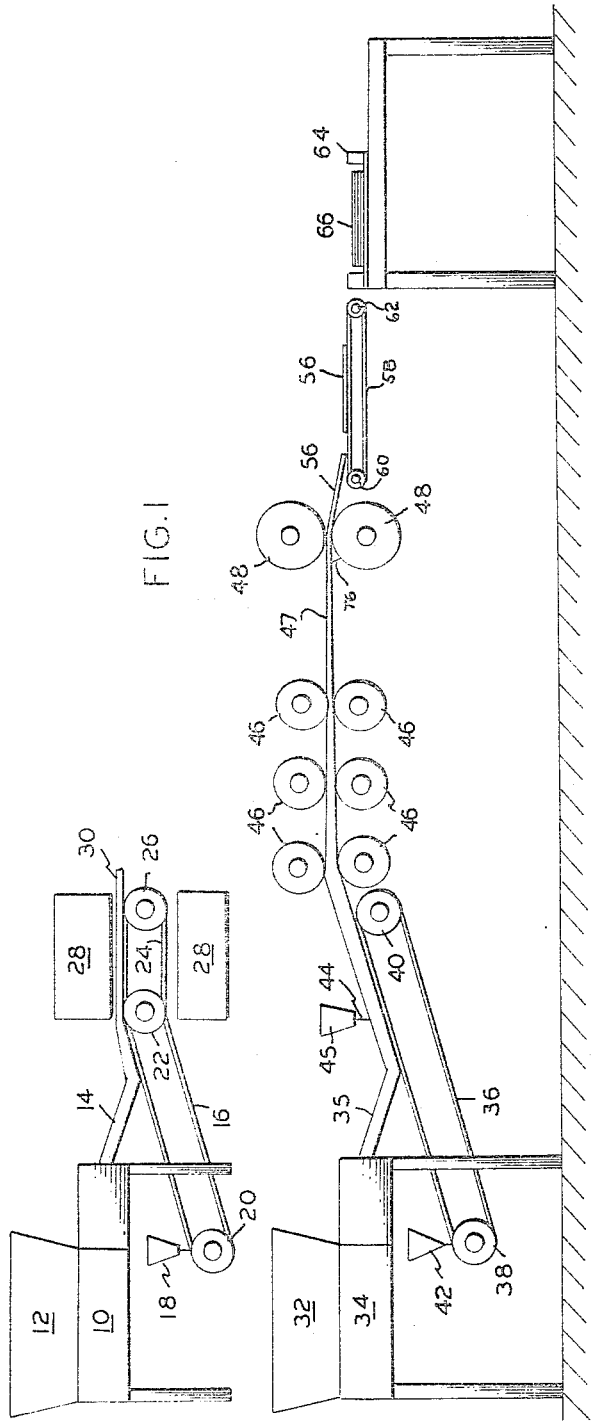
Feb. 14, 1967     A. A. NOVISSIMO     3,303,796
CONTINUOUSLY FORMING THREE-DIMENSIONAL SHAPES
Filed Oct. 23, 1964     3 Sheets-Sheet 1
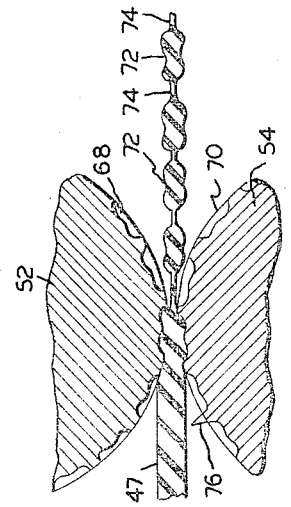
FIG. 3
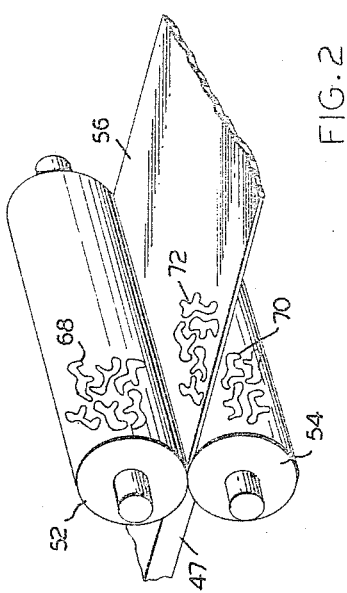
FIG. 2
INVENTOR
ALFRED A. NOVISSIMO
BY *Albert H. Gradets*
ATTORNEY Feb. 14, 1967    A. A. NOVISSIMO    3,303,796
CONTINUOUSLY FORMING THREE-DIMENSIONAL SHAPES
Filed Oct. 23, 1964    3 Sheets-Sheet 3

ATTORNEY

United States Patent Office 3,303,796
Patented Feb. 14, 1967

3,303,796
CONTINUOUSLY FORMING THREE-
DIMENSIONAL SHAPES
Alfred A. Novissimo, Jericho, N.Y., assignor to Warner-
Lambert Pharmaceutical Company, Morris Plains, N.J.,
a corporation of Delaware
Filed Oct. 23, 1964, Ser. No. 405,984
6 Claims. (Cl. 107—54)

This invention relates to a new improved method for continuously forming three-dimensional confectionary shapes in sheet form. More particularly, this invention relates to a new improved method for continuously forming slab chewing gum into three-dimensional shapes by a roll-pressing operation and to the resulting confectionary products so produced.

Heretofore, the practice of forming confectionary materials such as, for example, chewing gum has been to process a chewing gum base into strips having a substantially rectangular cross-section. Such rectangular sections are either wrapped individually as sticks or subsequently coated with a hard sugar shell. In either event, the resulting product is substantially rectangular in configuration.

On of the problems involved in the formation of three-dimensional chewing gum shapes such as those of the present invention is in continuously processing the chewing gum base in sufficient quantity to be economically feasible. Any slight production difficulties which may be involved in processing individual chewing gum units will adversely affect production techniques which are dictated primarily by industry economy.

It has now been found by the method of the present invention that confectionary items may be formed in any desired three-dimensional configuration of sufficient detail to be readily identified either prior to or subsequent to coating with a hard sugar shell. The present invention is based upon the discovery that three-dimensional shapes may be continuously processed from a ribbon of chewing gum base or similar confectionary base by forming the shapes by rolling such that a thin webbing of chewing gum is permitted to join the individual shapes from the roll-forming operation. The rolled ribbon of chewing gum which results is a series of individual shapes joined by a thin webbing which may be subsequently removed from the formed shapes by a tumbling process wherein the joining webbing is removed by the tumbling action of the individual shapes. After the individual shapes are removed from the excess webbing, they may be processed further such as by coating with a hard sugar glaze or merely with a powder or candy coating.

It is an object of this invention, therefore, to provide a process for the continuous production of three-dimensional shapes such as those depicting animals, various physical structures, figurines and the like.

It is also an object of this invention to provide a method for the continuous production of shaped chewing gum pieces by a rolling operation from which a ribbon of chewing gum results containing a multiple number of formed sections joined by a thin webbing which webbing may be subsequently disjoined from the formed shapes by tumbling in a coating pan or similar rotating device.

It is a specific object of this invention to provide a method for the continuous production of three-dimensional chewing gum shapes in the form of animals which are formed by roll forming operation, separated by a tumbling operation and subsequently coated with a hard candy sugar coating.

Other objects and advantages of this invention will become apparent from the following detailed description taken with regard to the drawings in which:

FIG. 1 is a schematic view depicting the first half sequence of the roll-forming portion of the present invention;

FIG. 2 is a perspective view depicting the roll-forming operation;

FIG. 3 is a side elevational view of the roll-forming operation showing the rolling operation in greater detail;

Figure 4:
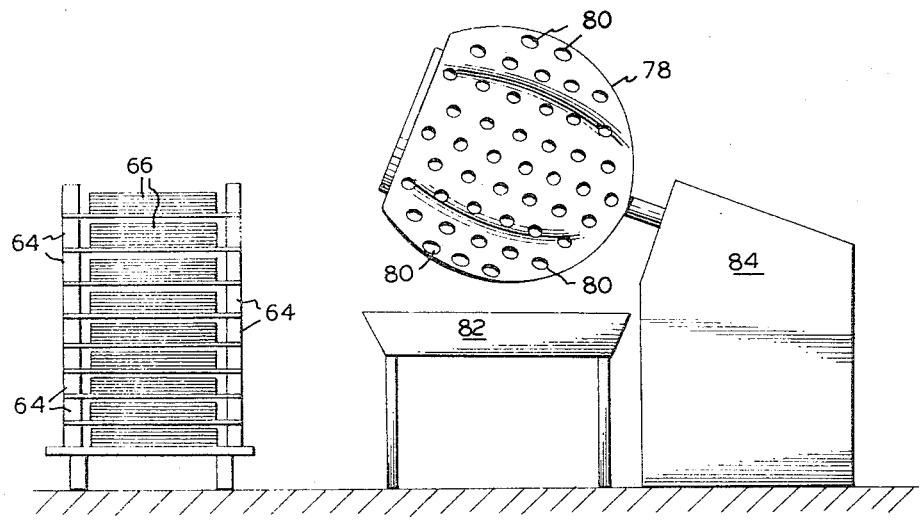
FIG. 4 is a side elevational view of a screen-coating pan useful for separating individual shapes from the joining webbing after the roll-forming operation.

As used herein, the term confectionary shapes is intended to mean products formed principally from sugars, confectioner's glucose and flavoring materials such that the product has sufficient body to withstand the roll-forming operation encountered for continuously forming the shapes. Usually, a chewing gum base having a density from about 1.15 to about 1.40 and preferably in the range from about 1.25 to about 1.35 is desirable. One useful chewing gum base formulation which may be used is as follows:

| Ingredients: | Parts by weight |
| --- | --- |
| Gum Base | 15 to 25 |
| Sucrose | 50 to 60 |
| Glucose | 15 to 25 |
| Softeners or fillers | 1 to 5 |
| Flavoring, q.s. | |

The gum base may be similar to those disclosed in U.S. Patent N. 2,197,719 and may contain 88 parts ester gum, 10 parts rubber latex solids, 2 parts commercial soya bean lecithin; 30 parts chicle, 60 parts Jelutong, 8 parts Gutta soh, and 2 parts commercial soya bean lecithin; 98 parts partially oxidized chicle, and 2 parts commercial soya bean lecithin; 80 parts Jelutong, 18 parts Gutta siak and 2 parts commercial soya bean lecithin with all parts being designated as parts by weight. A sugarless chewing gum formulation may also be usefully employed as may one containing active cariostatic agents and tooth rehardening materials such as the calcium phosphates.

The use of any of the approved FD&C dyes or lakes is contemplated for use in the present invention. Such dyes and lakes are indicated in the Federal Register of May 14, 1959; 24 F.R. 3851; Title 21—Food and Drugs, chapter 1, part 9, pages 1 to 9. These colorings may be employed separately or as blends. Generally, when lake colors are employed, it is desired to include alumina, calcium carbonate or any other acceptable edible substratum therewith. In all regards, the carrying medium comprises flavoring oils, which include all natural, essential and synthetic flavoring oils considered acceptable by the Food and Drug Administration.

The insoluble dyes and lakes such as those certified for drug use which includes D&C coloring materials are also useful herein. Exemplary of the preferred insoluble colors (dyes) are those coal tar colors (dyes listed under their Food and Drug Administration designations are D&C Blue #6, D&C Blue #9, D&C Green #6, D&C Violet #2, D&C Red #17, D&C Red #18, D&C Orange #5, D&C Yellow #7, D&C Yellow #11, D&C Red #6, D&C Red #7, D&C Red #35, D&C Orange #15, D&C Yellow #6, D&C Green #1, D&C Blue #1, and D&C Violet #7. Further exemplary colors are the substantially water-insoluble FD&C and D&C colors (dyes) listed in The Merck Index, sixth edition.

In making the confectionary items of the present invention, chewing gum is specifically exemplified although other paste-like confectionaries may also be employed such as those customarily employed in the formation of lozenges, caramel candies, waxed type chewable candies and the like. If desired, the present invention may also be applied to the formation of those materials wherein a ribbon of material maintains sufficient strength to join molded figures such as will hereinafter be described.

Referring now to the drawing, FIG. 1 shows a general processing scheme for continuously preparing sheets of formed confectionary items. After a chewing gum base has been prepared in the conventional manner, it is formed into a confectionary dough which is brought to a point of elasticity such that the dough may be rolled into a ribbon of convenient thickness. The dough is desirably in the form of a plastic mass having a smooth, creamy, non-crystalline plastic consistency. The ductility of the dough increases as the temperature rises and is readily rolled and worked between the temperature of 80° F. and 150° F. A lozenge dough having a ductility which is not substantially changed by ordinary variations in temperature between 85° F. and 150° F. is also usefully employed herein.

The prepared confectionary dough is added to an extrusion unit 10 of the ordinary type having hopper 12 into which lumps of prepared chewing gum may be placed and blended by mixing paddles, not shown, within the extrusion unit. Chewing gum from the hopper is forced from the extrusion unit through a delivery mouth of the unit in the form of a relatively thick flattened confectionary ribbon 14 which may be received on endless supporting belt 16 which is desirably pre-sugared with powdered sugar from sugar box 18. In addition to powdered sugar, powdered starch, flour and the like may also be employed in this and all subsequent sugar boxes.

Extrusion unit 10 is preferably driven by an electric motor, not shown, such that the rate of extrusion of the chewing gum is synchronized with the speed of endless supporting belt 16 driven by rolls 20 and 22. Adjacent supporting belt 16 is endless conditioning belt 24 which may be driven by roll 22 and supporting roll 26. The conditioning belt passes chewing gum ribbon 14 from belt 16 through conditioning tunnel 28 wherein the extruded gum ribbon is cured under conditions of controlled humidity and temperature. The cured confectionary dough 30 is received from conditioning tunnel 28 and transferred directly to second hopper 32 of a further extrusion unit 34, similar in all respects to extrusion unit 10. The dough is again blended by paddles within extrusion unit 34 to knead the dough prior to being extruded as ribbon 35 from a delivery mouth of extrusion unit 34 and onto receiving belt 36 driven by rolls 38 and 40. Again, the receiving belt is desirably powdered with sugar, starch, flour or the like from sugar box 42 to prevent ribbon 35 from sticking to the processing machinery. Extruded ribbon 35 may also be coated on the top surface by powdered sugar 44 dispensed from sugar box 45. As in the case of extrusion unit 10, extrusion unit 34 may be driven in synchronized fashion by an electric motor with the speed of receiving belt 36 inclined to the horizontal such that a continuous strip of confectionary dough is uniformly received from the extrusion unit.

The continuous strip of confectionary dough 35 next progresses from receiving belt 36 and into a series of kneading rollers 46 having progressively increasing speeds when the dough is pressed and drawn out as the sheet is advanced preparatory to delivery as a ribbon of dough to a roll-forming unit 48 consisting of a pair of forming rolls 52 and 54 described in greater detail hereinafter. The ribbon of confectionary dough 47 desirably has a thickness of about 0.070 inch to about 0.50 inch and preferably about 0.25 inch, with the thickness of the confectionary dough dependent upon the size and thickness of the final roll-formed shapes.

The roll-forming unit 48 desirably is provided with cutter blade 76 such that formed sheets from the roll-forming unit may be conveniently sized for easy handling. The formed sheets 56 may then be received on transport belt 58 suitably driven by rolls 60 and 62. The formed sheets may be received from the transport belt by catch tray 64 wherein cut sheets 56 are stacked 66 for further processing.

FIGS. 2 and 3 show roll-forming unit 48 in greater detail with ribbon 47 being advanced into the unit consisting of mating rolls 52 and 54. The mating rolls are provided with concave molds shown as animal figures 68 on the face of upper roll 52 and as 70 on the corresponding surface of lower roll 54. Although the concave molds are shown only on a portion of the upper and lower rolls, it is recognized that the entire upper and lower roll surfaces may be provided with such molds. The rolled sheet emerging from rolls 52 and 54 is depicted as a formed sheet 56 having animated figures 72 joined by thin webbing 74. Shown in greater detail in FIG. 3 is the roll-forming operation indicating more clearly how the ribbon of chewing gum 47 is received and molded between the rolls. A suitable blade 76 is also provided to cut the formed chewing gum ribbon into suitable lengths for easy handling.

Although the webbing 74 may be of any suitable thickness, it is found desirable for removal purposes that the thickness be maintained at less than about 2% of the original thickness of the ribbon as received in the roll-forming operation. The lower limit of thickness is greater than about 0.05% or a thickness sufficient to keep the formed ribbon together.

Although it is not essential to the present process, additional sugar boxes similar to boxes 18, 42 and 45 described heretofore in FIG. 1 may be conveniently disposed at other locations in the processing scheme of FIG. 1 such as between the kneading rolls. In addition, excess sugar may be brushed off the ribbon of dough by conventional rotating brushes known to the art.

If desired, the formed sheets 66 in catch tray 64 may be stored for a suitable aging period in the order of about 24 hours in a controlled environment of temperature and humidity.

After a suitable aging period, the formed gum sheets 66 in catch trays 64 may then be tumbled in coating pan 78 such as that shown in FIG. 4 conveniently perforated 80 such that webbing 74 may be removed and received in scrap box 82 from the formed shapes 72 retained within the coating pan. Coating pan 78 is desirably rotated by a suitable operating mechanism 84 which includes a conventional drive mechanism customarily employed in the art.

Figure 5:
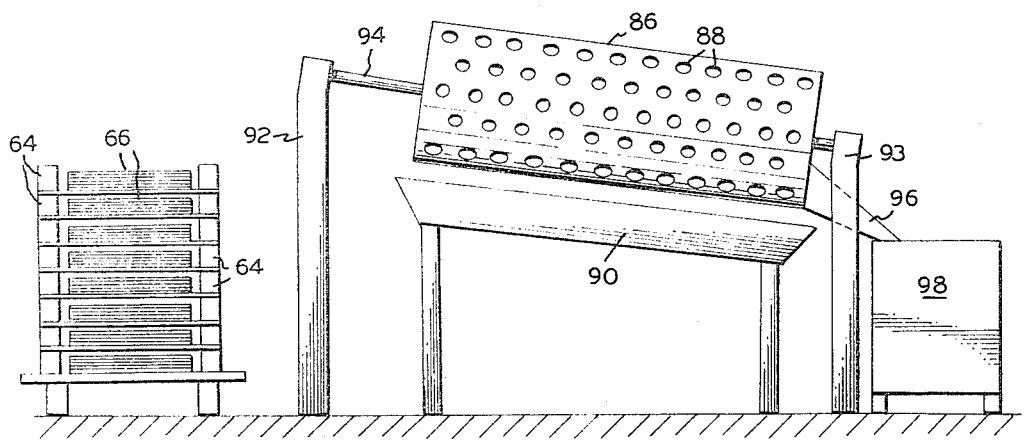
FIG. 5 is a modification of the rotating web-separating unit of FIG. 4 which is desirably used for continuous processing.

An alternate rotating mechanism 86 useful for removing webbing 74 from shapes 72 is that shown in FIG. 5, which is desirably employed for continuous removal of joining web materials from the molded shapes. Sheets of formed chewing gum 66 containing molded forms are taken from catch trays 64 and dumped into the rotating drum 86 having suitable perforations 88 therein for removal of the webbing which may then be received in a suitable scrap pan 90 suspended beneath rotating drum 86. Drum 86 may be conveniently supported by stand posts 92–93 and shaft 94 which may be powered by any suitable mechanism known to the art such as a belt or gear-type driving mechanism. The drum 86 is desirably maintained at a slight incline such as at an angle of about 2° to about 15° from the horizontal to insure that the tumbling formed shapes will progress through the rotating drum for removal of the webbing after which the shapes emerge from the rotating drum on chute 96 maintained in a stationary position and supported by post 93. The continuously processed chewing gum pieces may then be received from the chute by hopper 98 for subsequent processing.

The formed shapes having the webbing removed may now be subsequently processed as desired.

Figure 6:
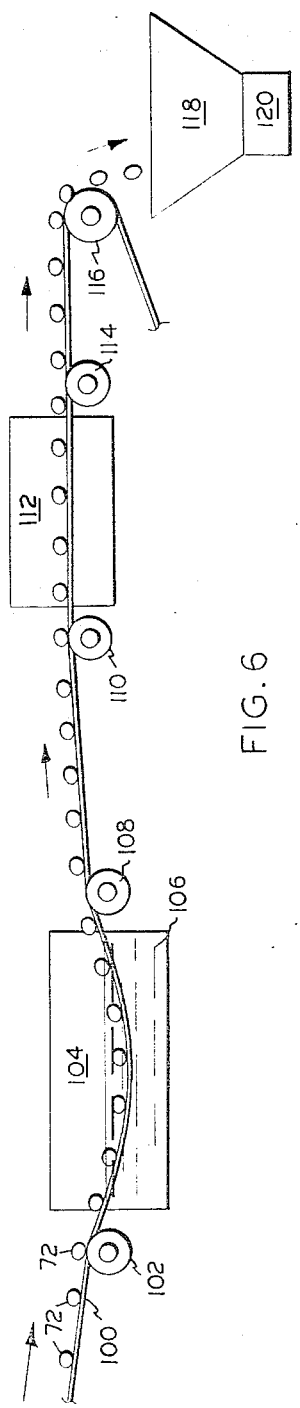
FIG. 6 is a schematic view depicting the second half-sequence of the processing operation wherein formed shapes may be coated; and, FIG. 7 is a schematic view depicting an alternate method for coating formed shapes by a spray coating operation.

One method desirably used to further process the formed shapes is that which is shown in the scheme of FIG. 6 wherein the individual shapes 72 are maintained on traveling belt 100 supported by guide roll 102 prior to entering coating dip tank 104. The coating dip tank is provided with a suitable coating material 106 such as, for example, a sugar candy coating material maintained in the liquid form. The individual shapes 72 are retained in the dip tank for a sufficient period of time for coating of the shapes to result. After the dip coating operation, the individual shapes are passed over guide rolls 108 and 110 prior to entering drying chamber 112 desirably heated with warm air. Alternate known methods of drying may also be employed.

From the drying unit 112 the individual shapes having the desired hard coating thereon are continuously conveyed over guide rolls 114 and 116 from which they are received by hopper 118 and shipping container 120. Alternately, the coated shapes may be individually wrapped or packaged in any convenient manner.

Figure 7:
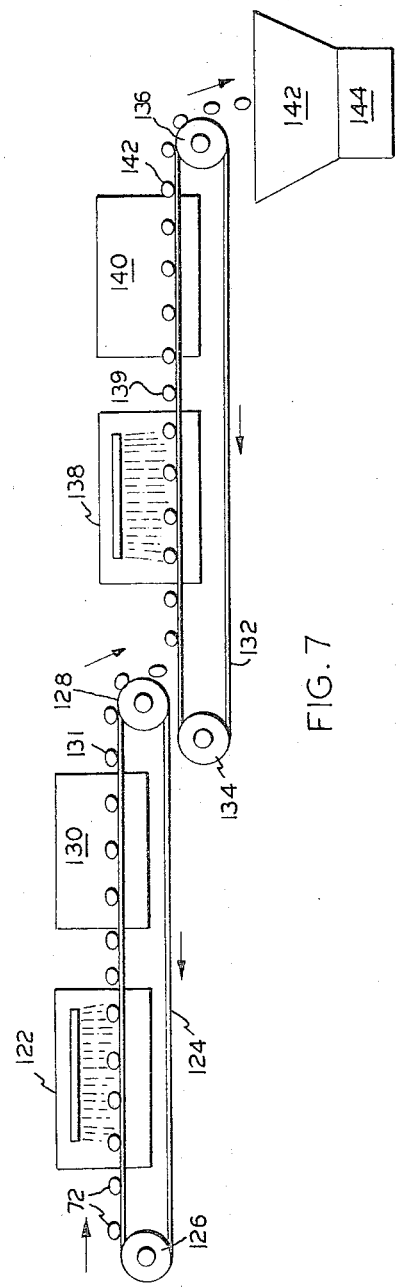

Another method which exemplifies a method of coating shapes 72 is that shown in the scheme of FIG. 7 wherein the shapes are continuously passed into first spray chamber 122 by endless belt 124 supported and driven by rolls 126 and 128. After the individual shapes 72 have been sprayed by a suitable coating material such as candy maintained in liquid form, they are passed through warm air drying chamber 130.

The shapes 131 now coated on one side continue from the drying chamber and are tumbled from belt 124 and onto endless belt 132 driven by rolls 134 and 136. The individual shapes, having the uncoated side exposed, are passed through a second spray chamber 138 wherein the operation of spray chamber 122 is repeated to completely coat the shapes 139. The completely coated shapes are again dried by passing through a second drying chamber 140 from which the dried coated shapes 142 pass and are received by tumbling from belt 132 into hopper 142 and receiving box 144. Thereafter, the coated shapes may be processed as previously described with regard to FIG. 6.

The shapes which are coated in the operation of FIG. 6 or FIG. 7 are found to be three-dimensional structures which have structural features which may be visualized by the naked, unaided eye as opposed to the customary smooth surfaced rectangular pillows of candy coated chewing gum well known to the art.

It is to be understood that the foregoing detailed description is given merely by way of illustration and that many variations may be made therein without departing from the spirit of the invention.

What is claimed is:

1. A method for continuously forming three-dimensional confectionary shapes which comprises, forming confectionary dough having a density from about 1.15 to 1.40, kneading the confectionary dough through a series of kneading rollers having progressively increasing speed, passing the kneaded confectionary dough through a roll-forming unit wherein formed confectionary shapes are continuously molded, said confectionary shapes being maintained in sheet form by a thin webbing joining the formed confectionary shapes, said webbing being subsequently removed by tumbling the confectionary shapes in a rotating drum and thereafter separating the confectionary shapes from the surplus webbing.

2. A method for continuously forming three-dimensional confectionary shapes which comprises, forming confectionary dough having a density from 1.15 to 1.40, kneading the formed dough, passing the kneaded dough through a forming roll wherein confectionary shapes are continuously formed as a continuous sheet having structural webbing joining the formed shapes, rotatably tumbling the formed shapes to separate the webbing from the formed confectionary shapes and thereafter continuously coating the confectionary shapes with a hard candy coating.

3. The method for continuously forming three-dimensional confectionary shapes as defined by claim 2 wherein the confectionary dough has a density from about 1.25 to about 1.30.

4. The method of claim 2 wherein the confectionary dough is chewing gum.

5. The method of claim 2 wherein coating the confectionary shapes is by dip coating.

6. The method of claim 2 wherein coating the confectionary shapes is by spray coating.

References Cited by the Examiner

UNITED STATES PATENTS 1,771,982   7/1930   Mustin _____ 99—135

A. LOUIS MONACELL, *Primary Examiner.*

H. H. KLARE, *Assistant Examiner.*